United States Patent [19]

Hoemann et al.

[11] Patent Number: 4,737,701
[45] Date of Patent: Apr. 12, 1988

[54] TAPPED AUXILIARY WINDING FOR MULTI-SPEED OPERATION OF ELECTRIC MOTOR AND METHOD THEREFOR

[75] Inventors: Keith I. Hoemann; Alan R. Barker, both of St. Louis County, Mo.

[73] Assignee: Emerson Electric Co., St. Louis, Mo.

[21] Appl. No.: 882,443

[22] Filed: Jul. 7, 1986

Related U.S. Application Data

[63] Continuation of Ser. No. 664,575, Oct. 25, 1984, which is a continuation-in-part of Ser. No. 489,847, Apr. 29, 1983, Pat. No. 4,486,699.

[51] Int. Cl.⁴ ............................................. H02P 5/28
[52] U.S. Cl. ..................................... 318/772; 318/817
[58] Field of Search ........ 318/816, 817, 772, 774–777, 318/794

[56] References Cited

U.S. PATENT DOCUMENTS

| | | | |
|---|---|---|---|
| 1,280,040 | 9/1918 | Jennings | 318/772 |
| 1,776,232 | 8/1929 | Kennedy | 318/772 |
| 1,837,394 | 12/1931 | Bailey | 318/794 |
| 1,934,060 | 11/1933 | Hanning | 318/772 |
| 1,979,160 | 10/1934 | Kennedy | 318/772 |
| 2,033,700 | 3/1936 | Lyden | 318/772 |
| 2,073,532 | 3/1937 | Ballman | 318/772 |
| 2,310,874 | 2/1943 | Schiff | 318/772 |
| 2,896,144 | 7/1959 | Mollenberg | 318/776 |
| 2,941,138 | 6/1960 | Ramer | 318/772 |
| 4,103,712 | 7/1978 | Spradling | 318/776 |
| 4,408,150 | 10/1983 | Holston et al. | 318/779 |
| 4,426,721 | 1/1984 | Wang et al. | 29/596 |
| 4,486,699 | 12/1984 | Hoemann et al. | 318/772 |

*Primary Examiner*—David Smith, Jr.
*Attorney, Agent, or Firm*—Polster, Polster and Lucchesi

[57] ABSTRACT

A capacitor motor and method is disclosed which utilizes one or more tap points within the auxiliary winding of the motor which can be selectively connected to a source of AC power via a selector switch for multi-speed operation of the motor.

3 Claims, 7 Drawing Sheets

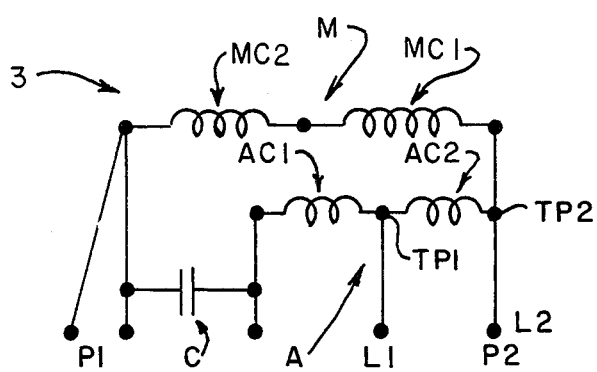
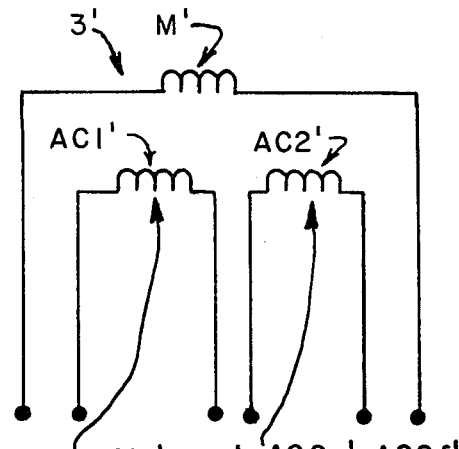
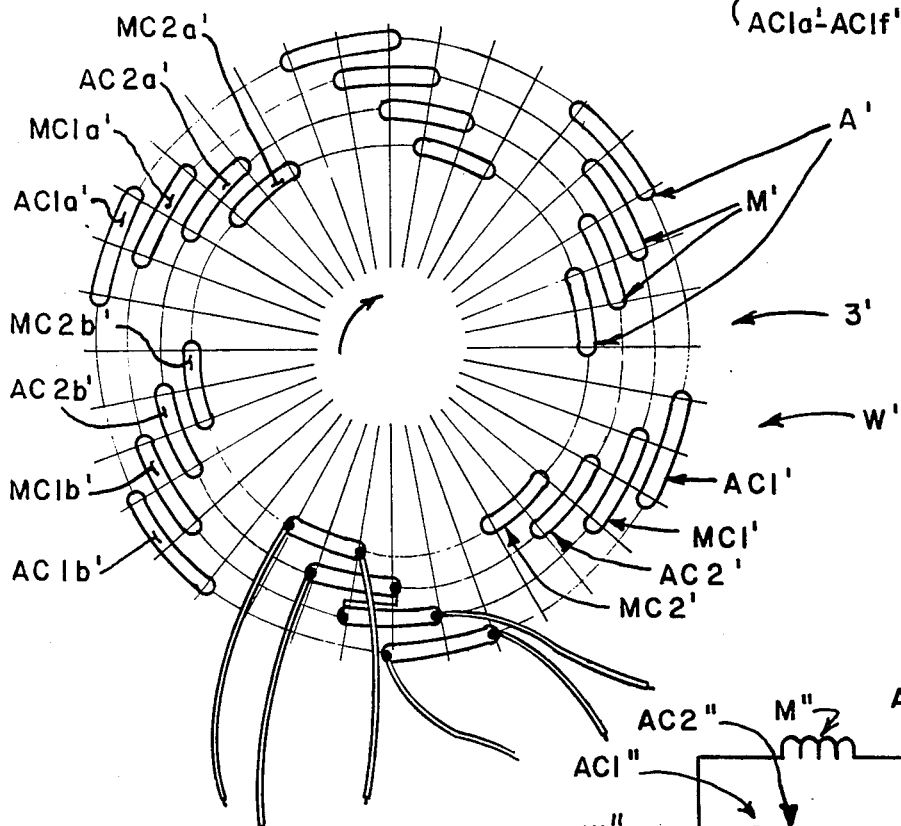
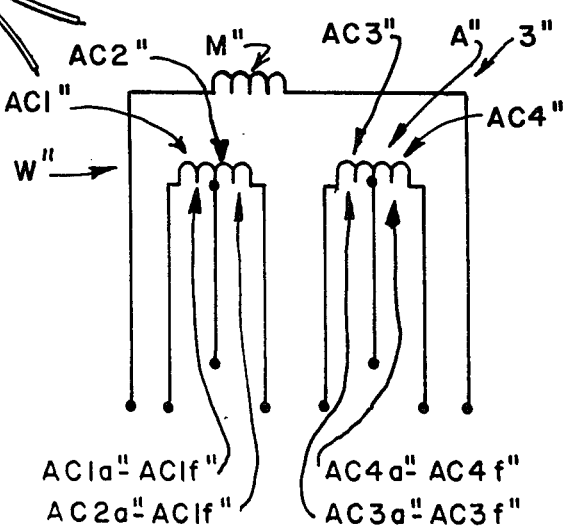

TAPPED AUXILIARY WINDING FOR MULTI-SPEED OPERATION OF ELECTRIC MOTOR AND METHOD THEREFOR

This is a continuation application of copending application Ser. No. 664,575, filed on Oct. 25, 1984, which is a continuation-in-part of application Ser. No. 489,847, filed Apr. 29, 1983, now U.S. Pat. No. 4,486,699, issued Dec. 4, 1984.

BACKGROUND OF THE INVENTION

This invention relates to a multiple speed dynamoelectric machine, and more particularly to a multiple speed permanent split capacitor (PSC) or other capacitor-run multi-speed induction motor, such as may be utilized to directly drive a fan mounted on the rotor shaft of the motor.

Generally, in a motor application for use with a direct drive overhead ceiling fan or the like, the motor is designed to run at a relatively slow speed. For example, a multiple-speed overhead ceiling fan motor may be operated at a maximum speed of about 350 rpm and at a minimum speed of about 50 rpm. These motors generally are multiple pole motors having either 12 or 18 poles, as compared to more conventional 2, 4, 6, or 8 pole motors. A PSC motor is a capacitor run motor that uses its auxiliary winding and capacitor continuously, without change in the capacitance. No starting switch or relay is required to switch out the auxiliary winding of the motor once the motor has attained its operational speed. Typically, a PSC motor comprises a main winding adapted to be connected across two AC power lines. An auxiliary winding and a permanent running capacitor are wired in parallel to the main winding so that upon energization of the windings, the main winding and the auxiliary winding are spaced 90 electrical degrees apart. A squirrel-cage-type rotor is usually utilized in PSC induction motors.

In a number of PSC fan motor applications, it is highly desirable to provide for multiple speed operation of the fan motor. Speed control of a PSC motor is typically obtained by adjusting the flux of the motor and thereby changing the slip. As a general rule, pole changing is not utilized with PSC motor applications. There are four basic methods of changing the flux of the stator and thereby changing the slip and operating speed of a PSC motor. A first method of speed control of a PSC motor utilizes a change of connections of the main windings. Secondly, the voltage impressed on one or both the main and the auxiliary winding may be changed. Thirdly, an external impedance or capacitance may be placed in series with the main winding of the motor. And, fourthly, various tapping methods using autotransformers and secondary main windings are used.

Looking first at voltage change methods for speed control, these methods typically employ a simple autotransformer used in conjunction with the PSC motor such that the voltage on both the main winding and the auxiliary circuit (i.e., the permanent capacitor and the auxiliary winding) is the same at all times, but the actual voltage applied to the main and auxiliary windings is varied depending on the tapping point of the autotransformer.

In utilizing voltage changes for speed control purposes, the PSC motor is normally operated at its high speed mode of operation when the full voltage of the AC power supply is utilized to energize both the main and auxiliary windings of the motor. For example, in an overhead ceiling fan motor application using voltage speed control, the full AC line voltage (120 volt) would be impressed across the windings resulting in high speed operation of the motor (e.g., 350 rpm). For medium speed operation of the motor, the autotransformer in parallel with the main and auxiliary windings is tapped at an intermediate point so as to reduce the voltage impressed on both the main and auxiliary windings with a corresponding speed-torque curve reduction such that the torque of the motor is less than at its high speed operation with the drag or slip of the fan blades resulting in a steady state operating speed of the motor slower than its high speed mode of operation. Likewise, slower speed modes of operation may be obtained by further reducing the voltage (and hence the torque) of the motor. In voltage speed control systems, the operating speed of the motor generally depends on the load applied to the motor. Also, the locked rotor torque of the motor is necessarily low when the motor is operated at its low speed mode of operation and the low speed connection is inherently unstable because the fan-torque and motor-torque curves intersect one another at a very small angle such that the motor is sensitive to changes in voltage and in load.

If an external impedance is utilized for speed control purposes, the impedance typically is either a resistor or a reactor which is connected in series with the main winding such that the voltage impressed across the main winding is reduced when the impedance is connected in series to the main windings thereby reducing the flux and increasing the slip of the motor and in turn reducing the operating speed of the motor. In the coassigned U.S. Pat. No. 4,408,150, a capacitor is interconnected in series with the main winding of the motor and which, when serially connected to the main winding of the motor, results in a reduction in speed of the motor.

In tapped winding speed control arrangements, such motors typically effect speed control by flux control, accomplished primarily by changing the impressed volts per turn on the main winding. Generally, tapped winding motors vary the volts per turn (and hence the flux, slip, and speed of the motor) by changing the number of series conductors in the main winding. For example, a two speed tapped winding motor utilizes three windings including a main winding, an extra main or intermediate main winding, and an auxiliary winding. The main and intermediate main windings are wound in space phase with one another (i.e., one is wound on top of the other) in the same slots, with the same distribution but not necessarily with the same number of turns or wire size. For more than two speeds, the intermediate main winding itself is tapped.

In a recently commercially available PSC direct drive fan motor, only one main winding was provided and the auxiliary winding was tapped at different locations. Through the use of a double pole, triple throw speed selector switch, selected physical poles of the auxiliary winding could be electrically removed from the remainder of the auxiliary winding in parallel with the main winding, or the tapped auxiliary winding could be utilized as a voltage divider thereby to change the flux impressed upon the windings of the motor. However, because one or more of the physical poles of the auxiliary winding of this motor is not energized at the intermediate or slower speeds of operation of the motor, the flux distribution of this motor is not balanced around the stator core and this unbalanced magnetic flux results in noisy operation of the motor at slower speeds.

SUMMARY OF THE INVENTION

Among the several objects and features of the present invention may be noted the provision of a multi-speed induction motor and method of speed control therefor which enables multiple speed operation of the motor, but yet which does not require the use of autotransformers, external impedances, external capacitors, or additional main windings, and yet results in a balanced flux distribution at all of its operational speeds;

The provision of such a motor and method which significantly lessens the amount of magnet wire required for the windings of the motor (as opposed to prior art tapped winding speed control methods using intermediate main windings);

The provision of such a motor and method which utilizes a single pole speed selector switch thus enabling a motor of the present invention to replace existing multi-speed motors without the necessity of changing the switching network;

The provision of such a motor which has a significantly lower slot fill and which has windings which are relatively easy to insert in the slots of the stator core during manufacture;

The provision of such a motor which eliminates the necessity of a fast acting thermal protector switch for protecting the windings of the motor against overheating in the event the motor capacitor fails is a shorted condition; and The provision of such a motor and method which has a lower production cost than other multi-speed PSC motors, which is reliable in operation, and which is quiet in operation at all operational speeds.

Briefly stated, a multiple speed electrical induction motor of the present invention has a stator core comprising a stack of laminations of suitable ferromagnetic material. The core has a central bore extending therethrough and a plurality of slots extending generally radially outwardly from the bore. A rotor is rotatably received within the bore and windings are inserted in the stator slots, these windings comprising a main winding and an auxiliary winding. A capacitor has one side thereof connected in series with the auxiliary winding. The auxiliary winding is comprised of a plurality of coil sets with each coil set having a plurality of serially connected coils placed in the stator core slots at substantially equal angular intervals around the central bore of the core so as to constitute the poles of the windings. A first tap point is provided between the first and second coil sets of the auxiliary winding and a last tap point is provided between the last of the coil sets of the auxiliary winding and the main winding. A pair of power lines is connected to a source of alternating current power, with one side of the main winding and the other side of the capacitor being connected to one side of this power source, and with the auxiliary winding being connected to the other side of this power source. A speed selector switch is provided having a movable switch arm or member which is connected to the other side of the main winding, this switch arm being movable between a high speed position in which a maximum number (e.g., all) of the coil sets of the auxiliary winding is energized in series with the capacitor, and in which the maximum number of coil sets of the auxiliary winding, the capacitor, and the main winding are in parallel with the other side of the power source such that the motor operates in its high speed mode of operation. The speed selector switch is further operable in a low speed position in which a minimum number of coil sets of the auxiliary winding (e.g., one such auxiliary coil set) is connected in series with the capacitor, and in which the minimum number of auxiliary coil sets, the main winding, and the capacitor are in parallel with the other side of the power source such that the motor operates at a slow speed mode of operation.

Other objects and features of this invention will be in part apparent and in part pointed out hereinafter.

BRIEF DESCRIPTION OF THE DRAWINGS

FIG. 4 is a schematic of the windings shown in FIGS. 2 and 3;

FIG. 5 is a diagrammatic view, similar to FIG. 3, of a stator for a 12 pole, 2 speed PSC motor having a single main winding divided into two main winding coil sets and a single auxiliary winding which is also divided into two auxiliary winding coil sets with the coils of the main and auxiliary coil sets being inserted into the slots of the stator core in layered groups;

FIG. 6 is a schematic of the windings shown in FIG. 5;

FIG. 8 is a simple schematic of the windings and leads shown in FIG. 7;

Corresponding reference characters indicate corresponding parts throughout the several views of the drawings.

DESCRIPTION OF PREFERRED EMBODIMENTS

Figure 1:
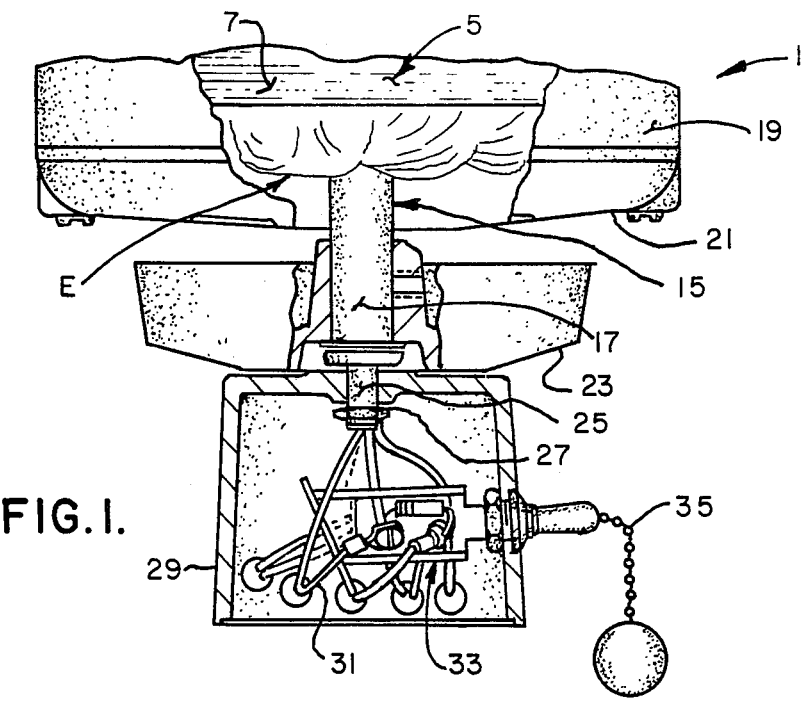
FIG. 1 is a side elevational view of a portion of an overhead ceiling fan illustrating a multiple speed permanent split capacitor (PSC) motor of the present invention and a speed selector switch with portions broken away to show details of construction of the motor and the switch.

Referring now to the drawings, and particularly to FIG. 1, a dynamoelectric machine of the present invention is indicated in its entirety by reference character 1. Specifically, this dynamoelectric machine is shown to be a multiple-pole, multiple-speed permanent split capacitor (PSC) induction motor. While the motor 1 utilizing the speed control system, construction and method of the present invention is herein described as a PSC motor, those skilled in the art will appreciate that this invention will have applications in other types of motors (e.g., other capacitor run motors) and that the multiple-pole (e.g., 12 and 18 pole) motors herein described may have significantly fewer poles.

Figure 2:
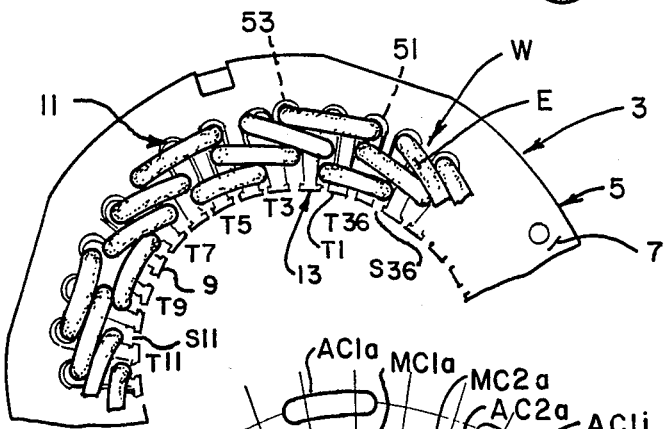
FIG. 2 is an end view of a portion of a stator of an 18 pole, 2 speed PSC skein wound motor having a single main winding divided into two main winding coil sets and a single auxiliary winding divided into two auxiliary coil winding sets with the coils of the main and auxiliary coil sets being inserted into the slots of the stator core in layered groups to constitute the physical poles of the motor.

More specifically, motor 1 has a stator assembly 3. The stator is comprised of a core 5 made up of a stack of laminations of suitable ferromagnetic material. The core 5 has a central bore 9 extending longitudinally therethrough with a plurality (e.g., thirty six) slots 11 extending radially outwardly from central bore 9 and with a plurality of teeth 13 separating the slots. As shown in FIG. 2, core 5 has thirty-six slots 11 formed therein (as indicated by slots S1–S36) with a respective tooth 13 (as indicated by T1–T36) between each of the slots.

Motor 1 further includes windings, as generally indicated at W, which are inserted into slots 11 with these windings having end turns E extending out beyond the end faces of core 7, as shown in FIGS. 1 and 2. The motor further includes a rotor assembly, as generally indicated at 15, having a squirrel cage rotor body (not shown) which in turn has a hollow rotor shaft 17 extending endwise from the motor and with the rotor shaft being rotatable with the rotor body. The stator assembly 3 further includes a housing or shell 19 surrounding core 5 and extending out beyond the end turns E of the windings W. An end shield 21 is bolted to each end of the core 5 and to shell 19 and has a bearing support (not shown) formed therein for receiving a ball bearing or the like (also not shown) which in turn receives and journals rotor shaft 17 thereby to accurately, rotatably support the rotor assembly 15 within central bore 9 of stator assembly 3. On the portion of rotor shaft 17 extending endwise beyond end shield 21, a hub 23 is locked to the rotor shaft so as to be rotatable with the rotor shaft. In an overhead ceiling fan application, the paddle fan blades (not shown) of the overhead ceiling fan may be affixed to hub 23 such that the fan blades rotate with the rotor shaft 17.

As previously indicated, rotor shaft 17 is a hollow tubular member and it has a wireway 25 extending axially therethrough, this wireway being stationary with respect to the rotor shaft. A nut 27 is threaded onto the free end of wireway 25 and this nut holds a switch housing 29 in place on the lower end of the wireway. The wireway 25 is a tubular rod-like member and serves as a conduit through which various lead wires 31 are run to a multiple position speed selector switch, as generally indicated at 33, located within switch housing 29. In accordance with this invention, selector switch 33 may be a single pole, multiple throw switch having a switch arm SA operated by means of a pull chain 35 so as to selectively operate motor 1 at any one of a multiplicity of operating speeds. The lead wires 31 extend longitudinally through wireway 25 to the opposite end of the motor from that shown in FIG. 1 and the various lead wires are connected to an alternating current power source by power supply leads P1, P2 for supplying AC electrical power to selected portions of the windings W of the motor in accordance with the apparatus and method of this invention, as will be more particularly pointed out hereinafter.

Referring now to a more detailed description of windings W of motor 1, in general, the windings of a motor in accordance with the instant invention comprises a main winding, as generally indicated at M, and an auxiliary winding, as generally indicated at A. As shown in FIG. 2, the main winding M of the stator assembly 3 is constituted by two main winding coil sets, as indicated at MC1 and MC2. Likewise, the auxiliary winding A is constituted by two auxiliary coil sets, as indicated at AC1 and AC2. Stator assembly 3 illustrated in FIG. 2 is an eighteen pole skein wound winding inserted in the slots of a thirty six slot stator core 5. Such a skein wound coil set for either the auxiliary or main winding may be formed on a skein coil former, such as is disclosed in the coassigned U.S. Pat. No. 4,357,968, issued to Vernon E. Kieffer which is herein incorporated by reference. Additionally, the main coil sets and the auxiliary coil sets are inserted in the slots 11 of core 5 in layered groups of coils in the manner is described in the copending and coassigned U.S. Pat. No. 4,426,771, which is also herein incorporated by reference. Thus, a detailed disclosure of the manner in which the coil sets MC1, MC2, AC1 and AC2 are inserted in the slots 11 of core 5 may be had by making reference to the disclosure of the last-mentioned U.S. Pat. No. 4,426,771. Moreover, while the windings shown in FIG. 2 were heretofore described as being skein wound coil sets, it will be understood, particularly when reference is had to the above-mentioned U.S. Pat. No. 4,426,771, that the windings W may be so-called concentric wound coils inserted in the slots of the stator core in an overlapping insertion pattern in accordance with the method described in U.S. Pat. No. 4,426,771. It will also be understood that the windings W of stator assembly 3 may be skein wound and formed such that each of the coils of the coil sets of both the main and auxiliary windings span an equal number of teeth, such as disclosed in the co-assigned U.S. patent application Ser. No. 471,831 to Stephen M. Breit, which is also herein incorporated by reference.

Figure 3:
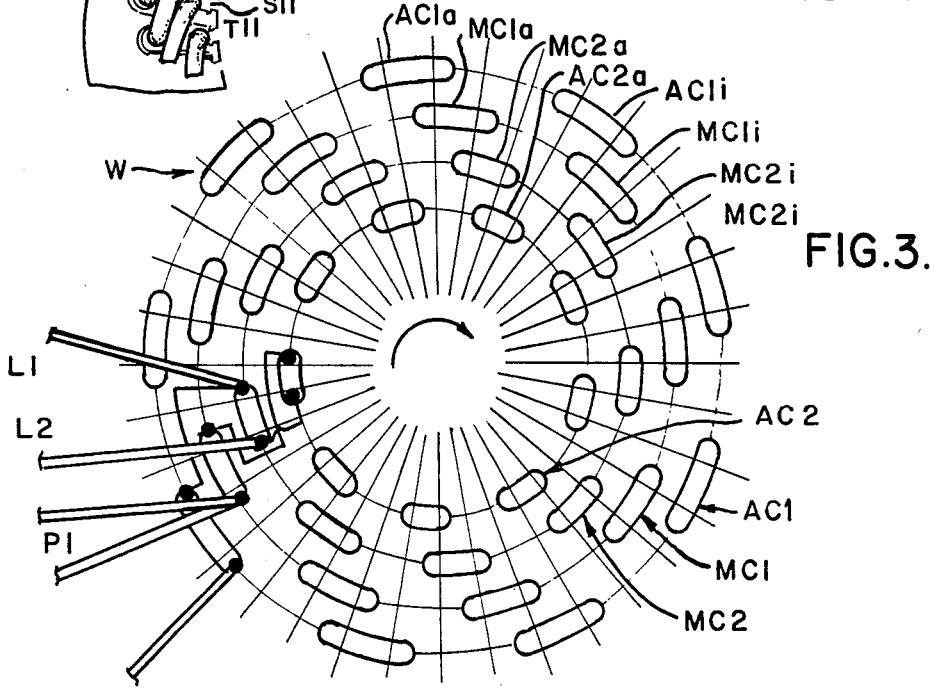
FIG. 3 is a diagrammatic view of the windings shown in FIG. 2, but from the opposite end of the stator core shown in FIG. 2.

Referring now to FIGS. 3 and 4, the pattern of the layered groupings of the main and auxiliary winding coil sets illustrated in FIG. 2 can be more easily seen. As heretofore explained, stator assembly 3, as shown in FIG. 3, is an eighteen pole winding inserted in stator core 5 having thirty-six slots S1–S36 with the windings being inserted in nine layered groupings of alternating coils of the auxiliary and main windings A and W so as to constitute the physical poles of the stator with these layered groupings being substantially equally angularly distributed around the core. More specifically, the first coil set AC1 of auxiliary winding A is shown to comprise a plurality (e.g., nine) of serially connected coils, as indicated at AC1a–AC1i. Likewise, the first main winding coil set MC1 comprises a plurality (e.g., nine) of serially connected coils, as indicated at MC1a–MC1i. Still further, the second main winding coil set MC2 comprises nine serially connected coils, as indicated at MC2a–MC2i, and the second auxiliary coil set AC2 comprises nine serially connected coils, as indicated at AC2a–AC2i.

As shown in FIG. 4, the main winding coil sets MC1 and MC2 are serially connected and thus form a continuous main winding M. Further, auxiliary winding coil sets AC1 and AC2 are connected in series with a first tap point TP1 therebetween connected to a respective leadwire L1 which extends out of the motor shell, down through wireway 25 for connections to the appropriate terminals of selector switch 33 for purposes as will appear. Another or last tap point, as indicated at TP2, is provided at the opposite end of the second or last auxiliary coil set AC2 and has a respective leadwire L2 connected thereto which extends exteriorily of the motor through the wireway for connection to selector switch 33. A permanent running capacitor, as indicated generally at C, is serially connected to the auxiliary winding A and, together with the auxiliary winding, is in parallel to main winding M.

As has been previously pointed out, each of the auxiliary winding coil sets AC1 and AC2 comprises a plurality of series connected coils, as indicated at AC1a–AC1i and AC2a–AC2i, respectively. In accordance with this invention, in the high speed mode of operation, 120 volt AC electrical power is connected to tap point TP2 via the leadwire L2 such that both of the auxiliary winding coil sets AC1 and AC2 together with capacitor C are connected in parallel with the entire main winding M to the other power input lead P1 whereby the motor 1 of the present invention operates in its high speed mode of operation. When it is desired to selectively switch the speed of motor 1 from its high speed mode of operation to its slow speed mode of operation, AC electrical power is removed from the last tap point TP2 and is applied to the first tap point TP1 via the leadwire L1. In this condition, capacitor C and only the first auxiliary winding coil set AC1 are connected in parallel to the main winding M. It will be noted that the second auxiliary coil set AC2 is now in series with the main winding M and thus constitutes a part of the main winding. It will be further be noted that in both the high and low speed modes of operation, the energized coils of the auxiliary winding (whether only the first auxiliary winding coil set AC1 or of the auxiliary winding coil sets AC1 and AC2 are energized), the coils are uniformly distributed around the stator core 5 at generally equal angular intervals so as to result in a balanced flux field for the motor which in turn results in quiet operation of the motor. It will also be noted that the speed control system of the present invention accomplishes effective speed control in a balanced fashion without the necessity of external inductive reactors, without the requirement of external capacitors, and without the requirement of additional intermediate main windings inserted in the slots of the stator core thereby resulting in a considerable savings of materials, in a lower slot fill for the motor, and resulting in a substantial savings in the amount of copper magnet wire required to form the windings W of the motor 1.

Referring now FIGS. 5 and 6, another stator assembly, as generally indicated at 3', is shown for another embodiment of a motor in accordance with this invention. It will be understood that the "primed" reference characters in regard to FIGS. 5 and 6 denote parts having a corresponding construction and function to corresponding parts heretofore described in regard to FIGS. 1–4. Generally, the primary difference between the stator assembly 3, as shown in FIGS. 3 and 4, and the stator assembly 3', as shown in FIGS. 5 and 6, is that stator assembly 3 is for an eighteen pole, two speed motor whereas the stator assembly 3' is for a twelve pole, two speed motor. In each instance, the stator cores 5 and 5' each include thirty-six radial core slots S1–S36 and S1'–S36', respectively. Since the construction and operation of stator 3' is generally similar to stator 3, as heretofore described, a detailed description of the construction and operation of the twelve pole, two speed PSC motor, as illustrated in FIGS. 5 and 6, will not be herein repeated for the sake of brevity.

Figure 7:
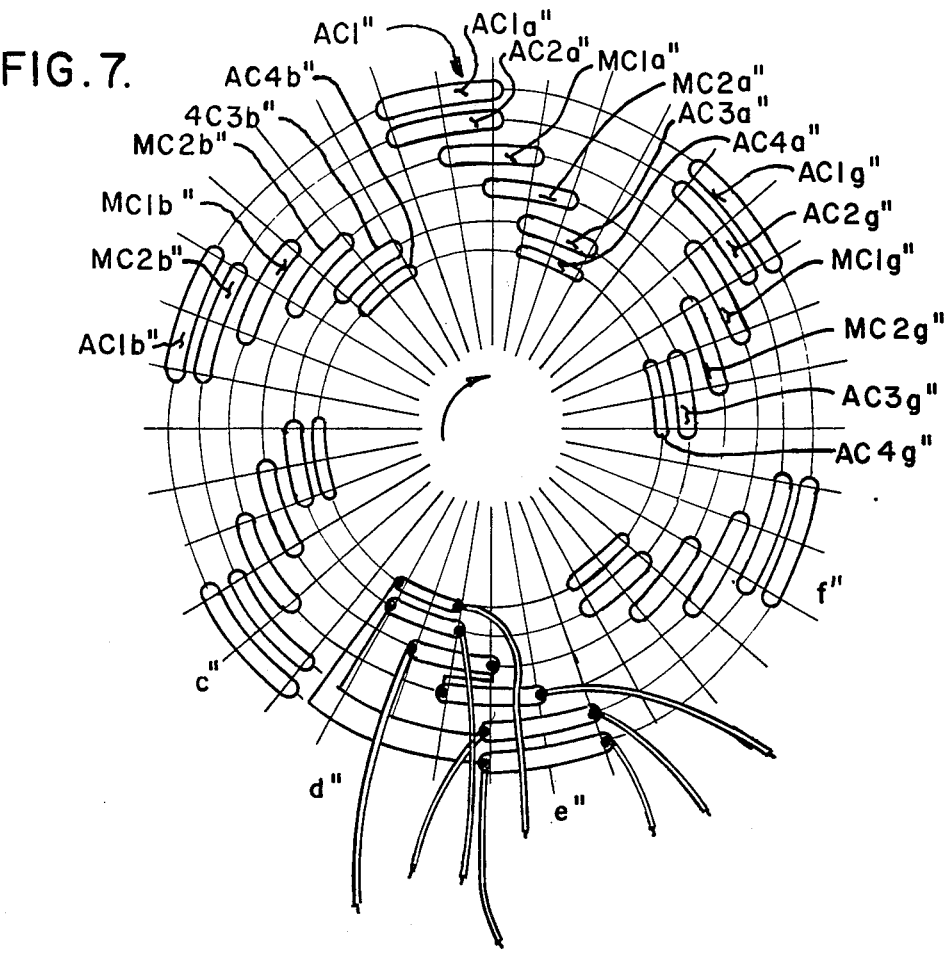
FIG. 7 is a diagrammatic view, similar to FIGS. 3 and 5, of a 12 pole, 4 speed PSC motor having a single main winding divided into two main winding coil sets and a single auxiliary winding divided into four auxiliary winding coil sets with the coils of the main and auxiliary windings being inserted into the slots of the stator core in layered groups each comprising two main winding coils and four auxiliary winding coils with a plurality of tapping points for the selective energization of each of the auxiliary coil subsets.

In FIGS. 7 and 8, still another embodiment of a stator assembly, as indicated at 3", incorporating the speed cOntrol system and method of the present invention is depicted. Generally, stator assembly 3" is intended for use in a twelve pole, four speed PSC electric induction motor. The "double primed" reference characters indicate parts having a corresponding construction and function to corresponding parts heretofore described in regard to the stators 3 and 3' shown in FIGS. 3 and 4 and in FIGS. 5 and 6, respectively. A primary difference between stator assembly 3" and stator assembly 3' is that the auxiliary winding A" has four auxiliary winding coil sets, as indicated at AC1"-AC4", whereas the auxiliary winding A' of stator 3' only has two auxiliary winding coil sets AC1' and AC2'. Even more specifically, each of the auxiliary winding coil sets AC1"-AC4" comprises a plurality (e.g., six) of serially connected coils. For example, coil set AC1" includes six serially connected coils AC1a"-AC1f". The coils of winding W" are inserted in core 5" in layered groupings generally in accordance with the above-mentioned, coassigned U.S. Pat. No. 4,426,771.

Figure 9:
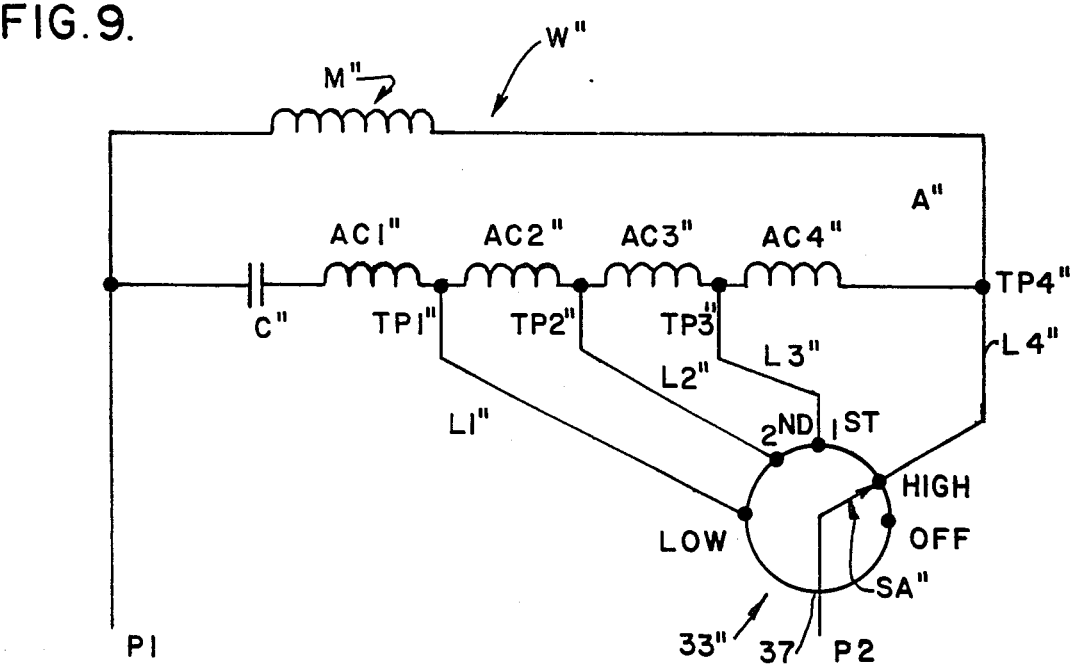
FIG. 9 is a schematic of the motor windings of FIG. 7 more detailed than FIG. 8 with the auxiliary coil sets shown as four separate auxiliary coilsets with the tapping points therebetween for connection to a source of AC power via a selector switch such that at a high speed switch position, all of the coil sets of the auxiliary winding are energized in series with the capacitor and the motor operates at its high speed mode of operation, such that at a low speed switch position, only one of the auxiliary winding coil sets is energized in series with the permanent capacitor and the other auxiliary coil sets are in series with the main windings such that the motor operates at its slow speed mode of operation.
Figure 9A:
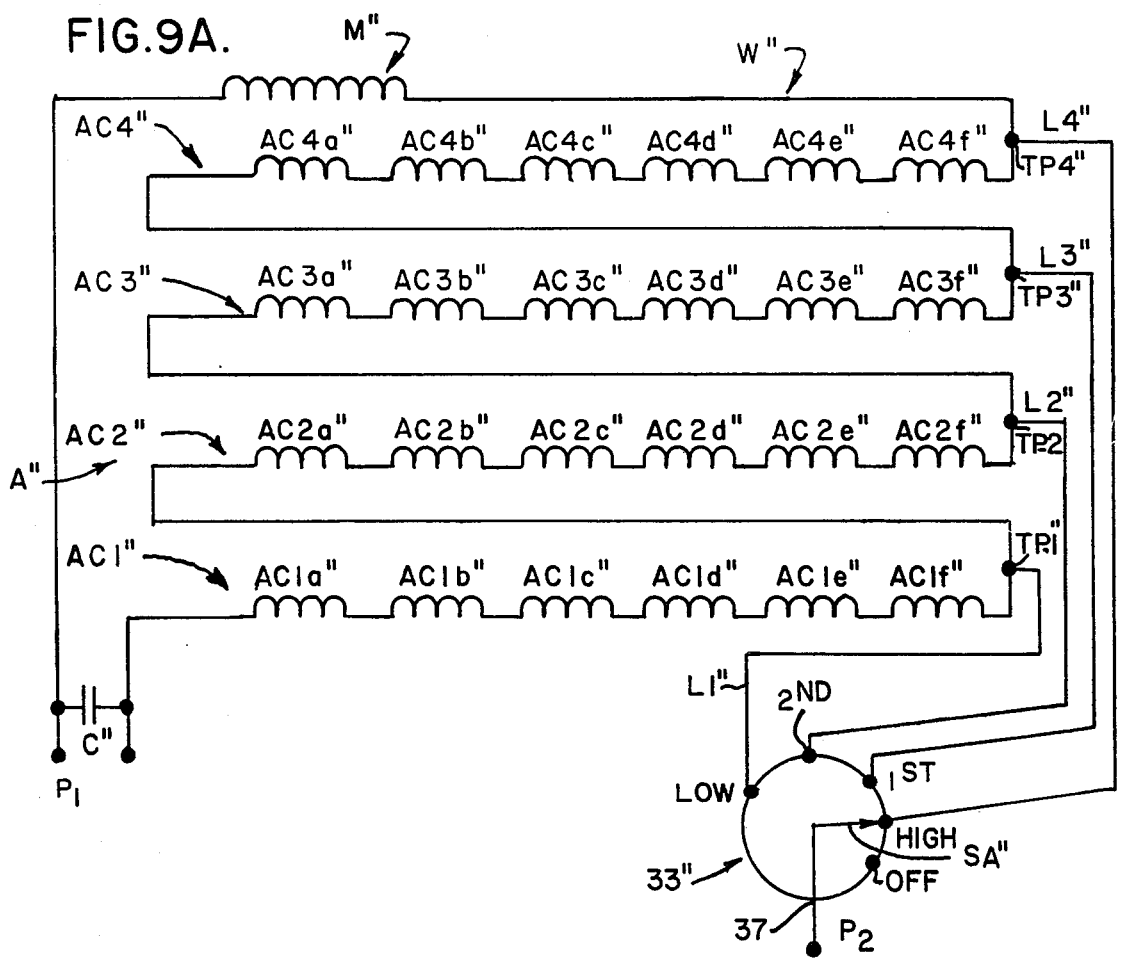
FIG. 9A is a still more detailed schematic of FIG. 9 showing that each of the auxiliary coil subsets has a number of (e.g., six) serially connected coils therein which are uniformly distributed around the stator core at generally equal angular intervals so as to result in balanced running of the motor at any of its selected operating speeds.

Referring now to FIGS. 9-11A, three different connection patterns for the twelve pole, four speed windings W", as heretofore described in regard to FIGS. 7 and 8, are illustrated. Referring first to FIGS. 9 and 9A, it will be seen that the auxiliary winding A" comprises four serially connected coil sets AC1"-AC4" in series with permanent run capacitor C". A first tapping point, as indicated at TP1", is provided between auxiliary winding coil sets AC1" and AC2". A second tapping point TP2" is provided between the second and third auxiliary coil sets AC2" and AC3", and a third tapping point TP3" is provided between the third and the fourth auxiliary coil sets AC3" and AC4". Still further, a fourth or last tapping point, as indicated at TP4", is provided between the last auxiliary coil set AC4" and main winding M". A multiple position, single throw, multiple pole speed selector switch, as indicated at 33", is provided and is connected to one of the power leads, as indicated at P2, of a source of AC electrical power. Switch 33" has a selectively movable switch arm SA" selectively movable to any one of a number of pole positions including an off position in which the windings W" are de-energized to a high speed position, to a first intermediate speed position, to a second or slower intermediate speed position, and to a low speed position. Respective lead wires L4", L3", L2" and L1" connected the high, first intermediate, second intermediate and low speed terminals of switch 33" to tap points TP4", TP3", TP2" and TP1".

In FIG. 9A, each of the auxiliary winding coil sets AC1"-AC4" is shown to each comprise six serially connected coils, as indicated by AC1a"-AC1f"—AC4a"-AC4f", respectively. Furthermore, the first tapping point TP1" is shown to comprise a connection between the first auxiliary coil set AC1" and the second auxiliary coil set AC2' and the low speed terminal of selector switch 33". The second tapping point TP2" is shown to comprise a connection between both the second and third auxiliary coil sets AC2" and AC3" and the second intermediate speed switch terminal of selector switch 33". The third tapping point TP3" is shown to comprise a connection between auxiliary coil sets AC3" and AC4" and the first intermediate selector switch contacts. Likewise, the fourth or last tapping position TP4" comprises an electrical connection between the fourth auxiliary coil sets AC4" and the main winding and between the high speed switch terminal of selector switch 33".

Thus, when switch arm SA" of switch 33" is moved from its off to its high speed position (as shown in FIGS. 9 and 9A), AC electrical power from lead P2 is supplied to the last tapping point TP4" thereby to connect all of the coil sets AC1"-AC4" in series with each other and in series with capacitor C" and so as to connect the capacitor and all of the coil sets in parallel with main winding M" such that the motor operates at its high speed mode of operation. When switch arm SA" is moved from its high speed position to its first intermediate operation, AC power from lead P2 is connected to tapping point TP3 such that only the first through the third auxiliary coil sets AC1"-AC3" are energized in series with capacitor C" and such that the first three coil sets are energized in series with both main winding M" and with the fourth auxiliary coil set AC4" such that the motor operates at its first or highest intermediate speed mode of operation. When the switch arm SA" is moved to its second intermediate position, AC electrical power from lead p2 is supplied to the second tapping point TP2" such that only the first and second auxiliary coil sets AC1" and AC2" are connected in series with capacitor C" and such that the last two auxiliary coil sets AC3" and AC4" are connected in series with main winding M" whereby the motor operates at a still slower intermediate speed of operation. Lastly, when switch arm SA" is connected to its low speed terminal, AC electrical power from lead P2 is supplied to the first tapping point TP1" such that only the first auxiliary coil set AC1" is connected in series with capacitor C" and such that the last three auxiliary coil sets AC2"-AC4" are connected in series with main winding M" whereby the motor operates at its slow speed mode of operation.

EXAMPLE

A K55 twelve pole PSC ceiling fan motor, such as is illustrated in FIG. 7-9A, was assembled in the manner heretofore described. The main winding M" included 285 turns of No. 30 copper magnet wire and the auxiliary winding A" included 284 turns of No. 30 copper magnet wire, having a total magnet wire weight of about 1.0 pounds (454 grams). The value of capacitor C" was six microfarads, 220 volts. When assembled in an overhead ceiling fan motor configuration with the paddle fan blades in place on hub 23, the motor was operated at four different operational speeds (i.e., high speed, a first intermediate speed, a second intermediate speed, and a low speed). The results of the tests for this motor showing selector switch position, current draw (as expressed in amps), power consumed (expressed in watts), and fan speed (expressed in RPM) are shown below in Table I.

TABLE I

| SPEED POSITION | CURRENT DRAW (AMPS) | POWER CONSUMED (WATTS) | SPEED (RPM) |
| --- | --- | --- | --- |
| High | .66 | 78 | 242 |
| 1st Intermed. | .50 | 56 | 185 |
| 2nd Intermed. | .37 | 38 | 123 |
| Low | .29 | 28 | 73 |

Figure 12:
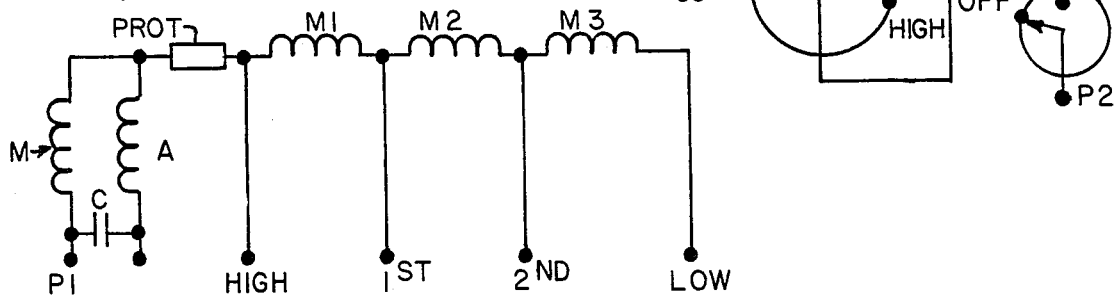
FIG. 12 is a schematic of a typical prior art PSC four speed motor having a first main winding, an auxiliary winding connected in parallel to the first main winding with a capacitor therebetween, and three intermediate or booster main windings in series with the first main winding, these intermediate main windings being selectively connectable to the first main winding thereby to progressively slow down the operating speed of the motor as more of the intermediate main windings are serially connected to the first main winding.

It will be understood that a comparable prior art motor, such as shown in FIG. 12, would require substantially more magnet wire for its windings.

Figure 10:
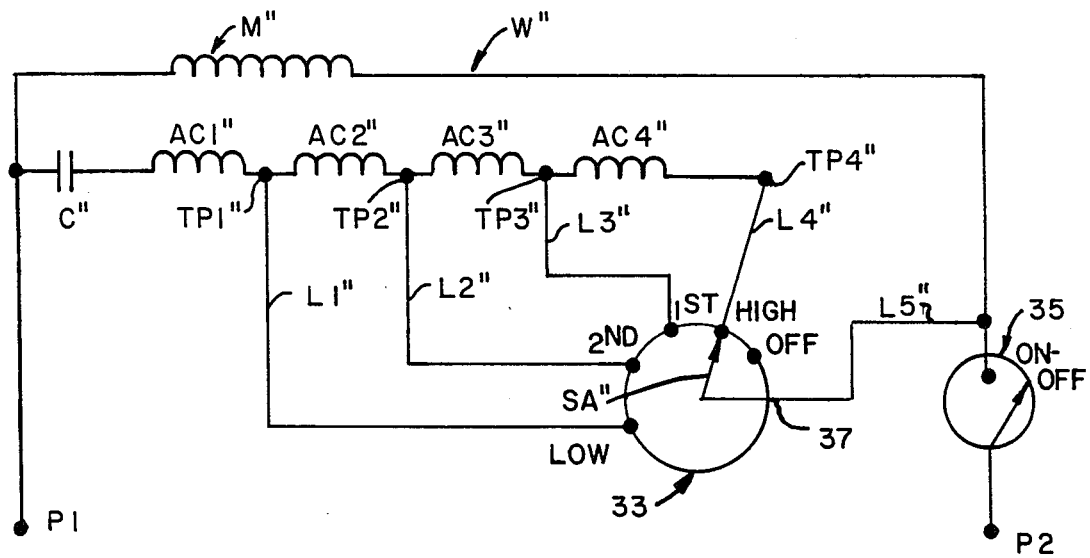
FIG. 10 is a schematic similar to FIG. 9 of the motor windings shown in FIG. 7, but with the selector switch connected to the auxiliary winding coil sets in a different manner than is shown in FIG. 9.
Figure 10A:
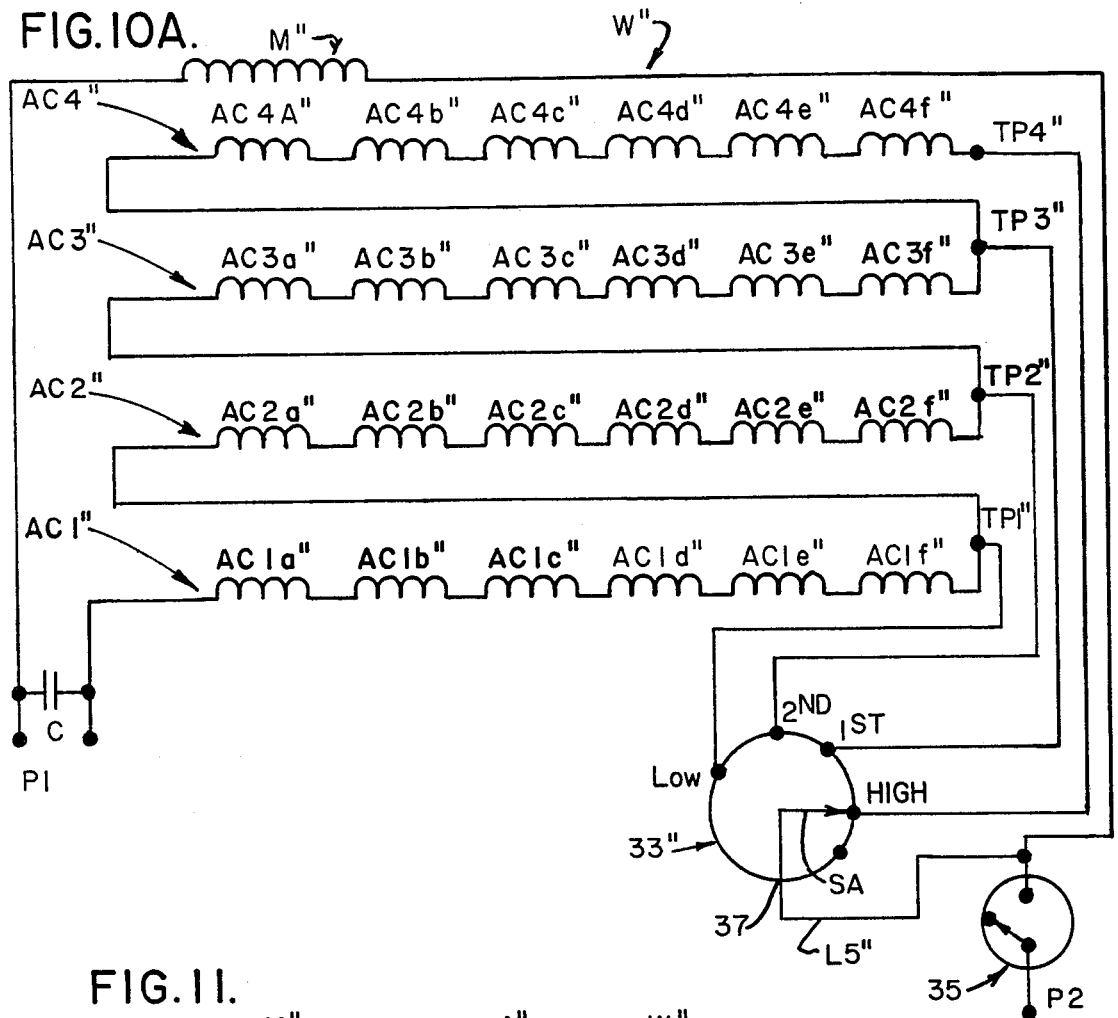
FIG. 10A is a more detailed schematic of FIG. 10.

Referring now to FIGS. 10 and 10A, an alternative lead wire connection pattern for windings W" inserted in stator core 5" in a manner generally similar to that shown in FIG. 7 is illustrated. As best shown in FIG. 10, the primary difference between the lead wire connection patterns between FIG. 9 and FIG. 10 is that the fourth auxiliary coil set AC4" of FIG. 10 is not connected in series to main winding M" except when switch arm SA" is in its high speed position. Still further, an on/off switch, as generally indicated at 35, is provided in series with power lead P2 so as to control energization and de-energization of windings W". With on/off switch 35 closed, AC power is supplied to main winding M" and to the power input terminal 37 speed selector switch 33" by a lead L5". With selector switch arm SA" in its high speed mode of operation, all of the auxiliary coil sets AC1"-AC4" are connected in series with one another and in series with capacitor C", and further all of the auxiliary coil sets and the capacitor are connected in parallel with main winding M" such that the motor illustrated in FIG. 10 operates in much the same manner as the motor illustrated in FIG. 9 in its high speed mode of operation. However, when the selector switch SA" of the motor of FIG. 10 is moved from its high speed position to its first intermediate speed position, to its second intermediate speed position, or to its slow speed position, one or more of the auxiliary coil sets AC4", AC3" and/or AC2" is removed from the auxiliary winding circuit such that when AC power from lead P2 is supplied to tapping points TP1"-TP3", the removed auxiliary coil sets are not placed in series with main winding M", but rather are de-energized. It will be appreciated that this is a different mode of operation than in the voltage divider embodiment shown in FIGS. 9 and 9A which when one of the slower speed modes of operation is utilized, one or more of the auxiliary coil sets is connected in series with the main winding and thus constitutes a portion of the main winding.

Figure 11:
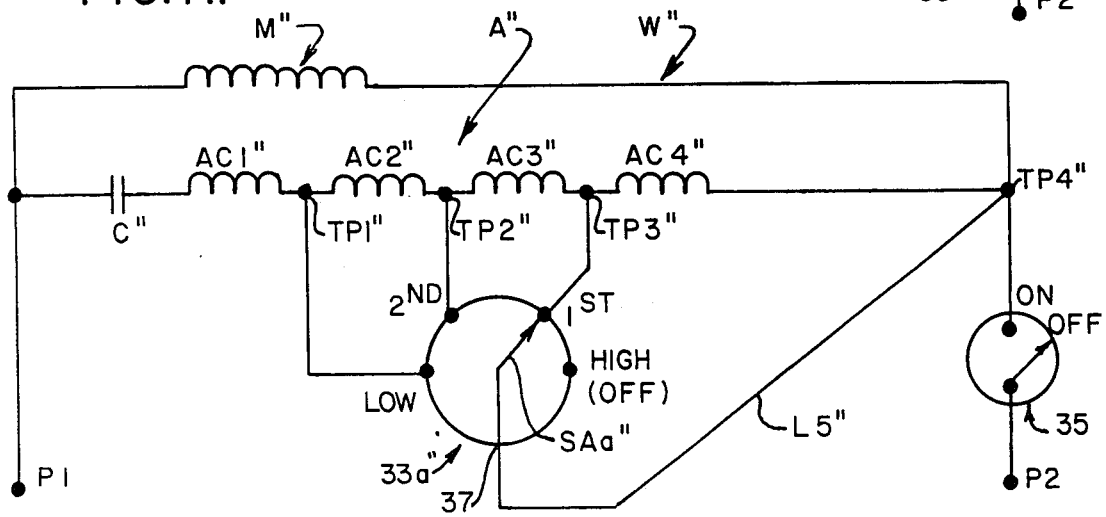
FIG. 11 is a schematic similar to FIGS. 9 and 10 of the motor winding shown in FIG. 7, but with the selector switch connected to the auxiliary winding coil sets in still a different manner.
Figure 11A:
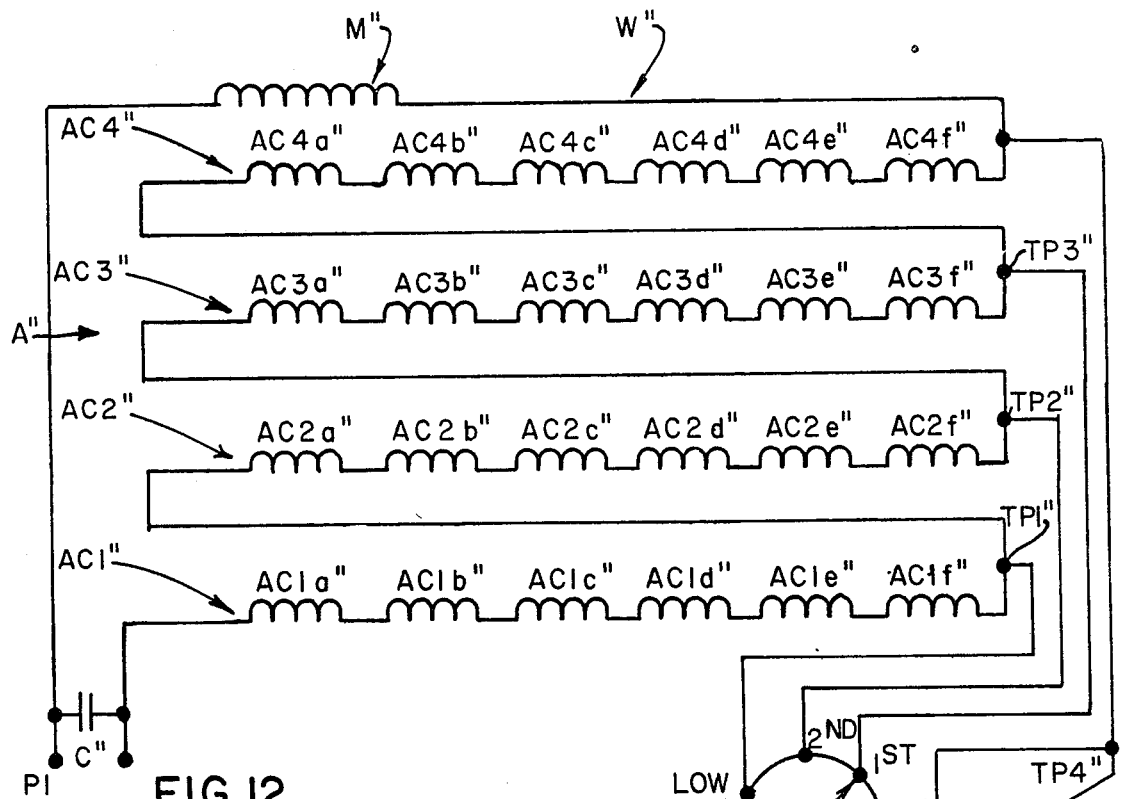
FIG. 11A is a more detailed schematic of FIG. 11.

Referring now to FIGS. 11 and 11A, still another connection pattern for the auxiliary winding A" is illustrated in which the speed selector switch, as indicated at 33a", is shown to be a four position speed selector switch (whereas the four speed selector switches 33" shown in FIGS. 9-10A was a five position switch) and yet four different speeds of operation may yet be controlled by means of the three speed selector switch 33a". More specifically, in FIG. 11, it will be noted that tap points TP1"-TP4" are generally similar to the tap points heretofore illustrated and described in regard to FIG. 9. However, a separate on/off switch 35, such as heretofore described in regard to FIGS. 10 and 10A, is interposed in power input lead P2. Still further, a power lead, as indicated at L5", interconnects tapping point TP4" (which is directly connected to power lead TP2 when on/off switch 35 is closed) and the input terminal 37 to speed selector 33a". Thus, when the four position speed selector switch 33a" is in its open or off position and when on/off switch 35 is closed, AC electrical power is supplied to tapping point TP4" such that the windings W" of FIG. 11 operate in a high speed mode of operation generally similar to the high speed mode of operation heretofore described in regard to both FIGS. 9 and 10. That is, in the high speed mode of operation, all of the auxiliary coil sets AC1"-AC4" are connected in series with capacitor C" and the auxiliary winding A" and the capacitor C" are in parallel with main winding M". However, upon moving the selector switch arm SAa" from its high speed position to one of its intermediate speed positions or to its low speed position, one or more of the auxiliary coil sets of the auxiliary winding are shorted out and thus the motor operates in a slower speed mode of operation. Thus, with the winding and switch configurations as shown in FIGS. 11 and 11a, four speeds of operation may be achieved utilizing a three operational speed speed selector switch 33a". It will be further understood that when one or more of the auxiliary coil sets AC2"-AC4" of the windings shown in FIGS. 11 and 11A are shorted out, so-called circulating currents will exist in the shorted auxiliary coil sets which may cause losses in these shorted coil sets which will, to some degree, reduce the operating efficiency of the motor. However, in certain motor applications, such as overhead ceiling fan applications in which the current draw for the motor is relatively low, such a motor, even with these inefficiencies, still has a satisfactory operating efficiency and does not result in excessive heating of the windings of the motor, even during prolonged operation of the motor at its slower speeds of operation.

Generally, the motor and method of this invention, as above-described, utilizes the auxiliary winding coil sets, which may be selectively energized in a predetermined manner, to vary the effective turn ratio between the auxiliary winding A and the main winding M. At higher speed modes of operation, the effective turn ratio is maximized and the motor operates at its higher speed mode of operation, while at low speed, a significant portion of the auxiliary winding is effectively removed (or placed in series with the main winding) thus reducing the effective turn ratio and the speed of the motor.

Referring now to FIG. 12, a prior art tapped winding PSC motor is shown utilizing three intermediate main windings, as indicated at M1-M3, connected in series with its main winding M. The auxiliary winding A together with the permanent capacitor C are connected in series with its main winding M. In its high speed mode of operation, electrical power is supplied between power lead P1 and the high speed switch position, as shown in FIG. 12, such that none of the intermediate main windings M1-M3 is energized in series with the main winding M thereby to permit the motor to operate in its high speed mode of operation. However, when the speed selector switch applies AC electrical power to the low speed switch point, as shown in FIG. 12, all three of the intermediate main windings M1-M3 are connected in series to the main winding M such that the voltage across the main winding is significantly reduced and such that the motor will operate at a slower speed mode of operation.

Figure 13:
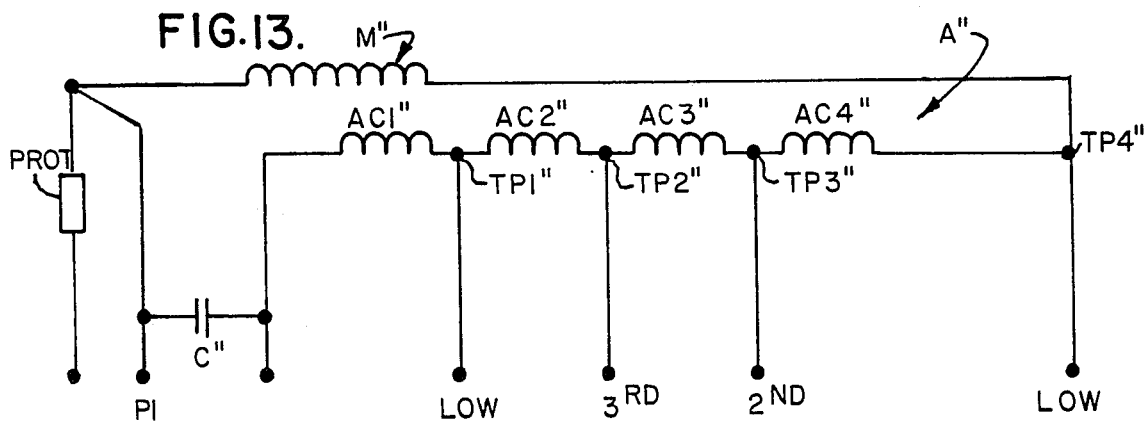
FIG. 13 is a schematic of a four speed PSC motor of the present invention in which the auxiliary winding is divided into four coil sets each having a plurality of coils which are uniformly distributed around the stator core so that with the speed selector switch in its high speed position, all of the auxiliary winding coil sets are in series with the capacitor and in parallel connection with the main winding, and such that with the speed selector switch in one of its intermediate or slow speed mode of operation, one or more of the auxiliary winding coil sets is in series connection with the capacitor and parallel to the main winding and such that the other auxiliary winding coil sets are in series connection with the main winding such that the motor operates at a slower speed mode of operation.

In FIG. 13, a motor generally analogous to the motor shown and described in regard to FIGS. 9 and 9A is depicted which, like the prior art tapped winding motor shown in FIG. 12, has four different operating speeds. However, it will be noted that the motor of the present invention (as shown in FIG. 13) only has two windings, that is main winding M" and auxiliary winding A". More specifically, the intermediate main windings M1-M3 of the prior art tapped winding motor of FIG. 12 have been eliminated, and yet the motor of the present invention, as shown in FIG. 13, has the same number of speeds as the prior art motor of FIG. 12. Surprisingly, however, the motor of the present invention as shown in FIG. 2 results in a substantial savings of copper windings due to the fact that the intermediate main windings M1-M3 of the motor can be eliminated. It has been found that for two speed motors made in accordance with this invention having substantially the same power output and the same speed range as similar prior art tapped winding motors (such as shown in FIG. 12) can result in a minimum savings of about twenty percent (20%) of copper magnet wire in the windings. However, if a multiple speed motor of the present invention and of the prior art having three or more speeds are compared, such motors made in accordance with this invention would result in even more substantial material savings. Those skilled in the art will recognize that this represents a significant cost savings. Moreover, the main and auxiliary windings of the motor of the present invention are easier to fabricate and to insert in the slots of the stator core due to the fact that the intermediate main windings have been omitted. Also, the motor of the present invention results in a lower slot fill. More specifically, "slot fill" is a term of art which is a ratio (expressed as a percentage) of the cross-sectional area of the slots 11 of core 5 filled by the windings W inserted therein and the total available cross sectional area of the slots. Motors made in accordance with the present invention have in slot fill reductions of at least 32%, compared with comparable prior art motors.

Figure 14:
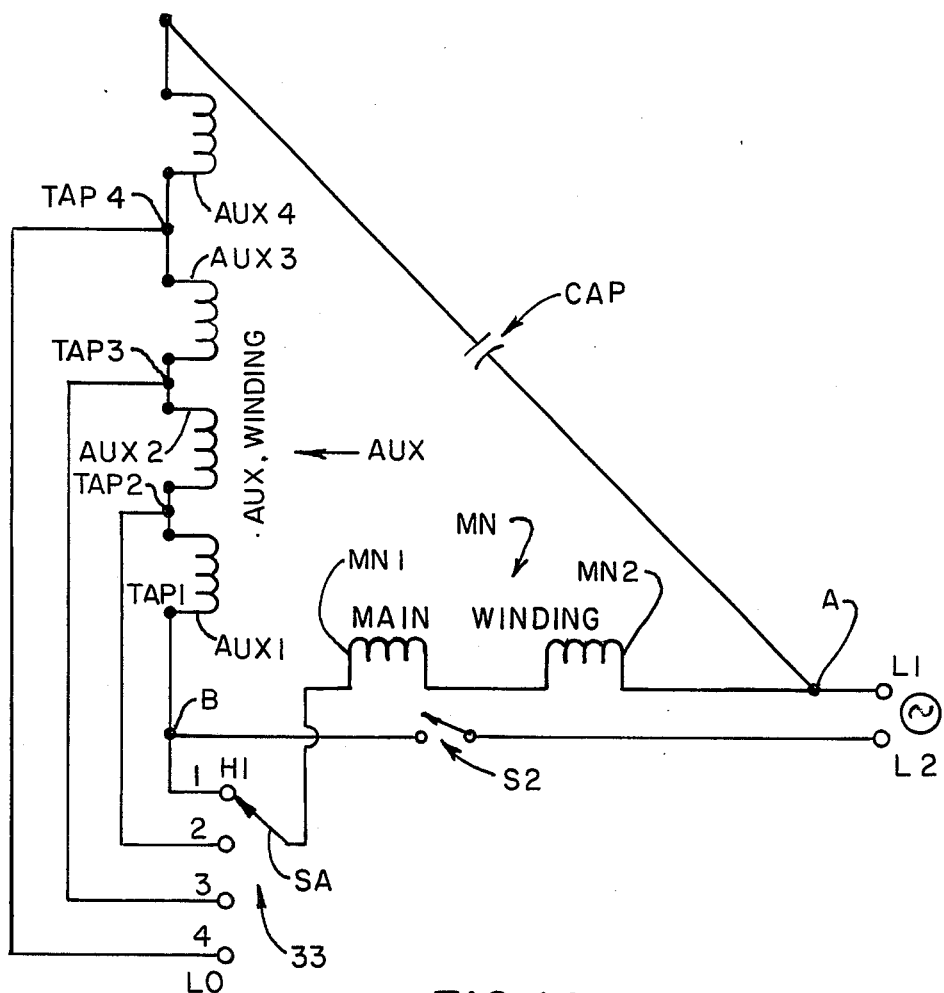
FIG. 14 is a diagrammatic view of still another embodiment of the windings of a motor of the present invention.

Referring now to the alternative embodiment of the multiple speed motor of the present invention shown in FIG. 14, the motor is shown to comprise a main winding, as generally indicated at MN, having two main winding coil sets MN1 and MN2, respectively. These main winding coil sets are spaced at substantially equal angular intervals around the stator such that the main winding is balanced within the stator. Additionally, the windings of this motor comprise an auxiliary winding, as generally indicated at AUX, having four auxiliary winding coil sets, AUX1-AUX4, which are also distributed at equal angular intervals around the stator, such that the auxiliary winding AUX is physically balanced within the stator. A running capacitor, as generally indicated at CAP, is parallel connected, as indicated at A, to one side of main winding MN, which in turn is connected to one side L1 of an alternating current power source. The other side of capacitor CAP is connected in series to auxiliary winding coil set AUX4. Further, all of the auxiliary winding coil sets AUX1-AUX4 are serially connected to one another, and have tap points TAP1-TAP4 therebetween As mentioned, one end of main winding MN is connected to a first power lead L1 of an alternating current power source, and the other end of the main winding is connected to the selector arm SA of a four-position speed selector switch, as generally indicated at 33. The speed selector switch has four terminals engagable by switch arm SA, with the first switch terminal 1 being connected to one end of auxiliary coil set AUX1 at TAP1, and to a second line L2 of the alternating current power source, as indicated at B. The second switch terminal is connected to tap point TAP2 between auxiliary coil sets AUX1 and AUX2. The third switch terminal is connected to tap point TAP3 between auxiliary winding coil sets AUX2 and AUX3. The fourth speed selector switch terminal is connected to tap point TAP4 between auxiliary coil sets AUX3 and AUX4. An on/-off switch S2 is provided in line L2 for energization and de-energization of the motor. It will be understood that in certain applications, such as in the blower motor of a furnace or the like, switch S2 may be controlled by the thermostat for the furnace, while in other applications, such as overhead ceiling fans, a separate on/off switch, separate from switch 33, may be required to selectively energize and de-energize the motor. Alternatively, a double pull switch (not shown) may be provided In operation with on/off switch S2 closed, and with switch arm SA of speed selector switch 33 in its first or high speed position, as shown in FIG. 14, switch arm SA is engageable with the first terminal of the speed selector switch such that all of the auxiliary winding coil sets AUX1-AUX4 are connected in series with capacitor CAP, and the entire auxiliary winding AUX and the capacitor are connected in parallel to both main winding coil sets MN1 and MN2. Thus, the motor operates in its high speed mode of operation. If speed selector switch arm SA is moved from its high speed position to a first intermediate speed such that the switch arm is in contact with the second switch terminal, then auxiliary winding coil sets AUX2-AUX4 and capacitor CAP are connected in parallel to main winding MN, and the capacitor, auxiliary coil sets AUX2-AUX4, and main winding MN is connected in series to auxiliary coil set AUX1 and the other lead L2 of the power source such that the motor operates at a first intermediate speed. With the switch selector arm SA3 moved into contact with the third switch terminal, auxiliary winding coil sets AUX3 and AUX4 are connected in series to the capacitor, and these last two mentioned auxiliary winding coil sets and the capacitor are in parallel with the main winding MN. Thus, the main winding, auxiliary winding coil set AUX3 and AUX4, and the capacitor are in series connection with the second power lead L2 and with auxiliary winding coil sets AUX1 and AUX2 such that the motor operates at a slower intermediate speed Finally, with switch arm SA4 positioned to be in contact with the fourth or low speed switch terminal, auxiliary winding coil sets AUX4 and the capacitor are connected in parallel to main winding MN, and auxiliary winding coil set AUX4, the capacitor, and the main winding are connected in series to the second power lead L2 and to auxiliary coil sets AUX1-AUX3 such that the motor operates at its slowest speed mode of operation. Of course, it will be realized that the number of coil sets in auxiliary winding AUX may be varied so that the motor may have any desired number of operational speeds.

In the embodiments of the present invention shown in FIGS. 1-13, it will be appreciated that the auxiliary windings of these motors remain in parallel connection with the ends of the main windings, and voltages applied to the taps within the auxiliary windings achieve different speeds of operation of the motor. In contrast, the motor of FIG. 14 has the ends of the entire main winding MN serially connected to different taps within the auxiliary winding AUX via switch 33 so as to achieve the different speeds of operation while one side of the line voltage of the alternating current source (i.e., L2) remains connected to one end of the auxiliary winding. In essence, this changes the type of connection for the motor from a so-called "L-connection" motor to a so-called "T-connection" motor.

Further, with the motors shown in FIGS. 1-13, it will be appreciated that in the event the running capacitor of the motor fails in a shorted condition when the motor is in its low speed mode of operation, all of the line voltage will be applied to only one coil set of the auxiliary winding. Since this one coil set of the auxiliary winding will have a relatively low resistance, and since the full line voltage is applied thereto, this can result in an extremely rapid resistance heating of the one auxiliary winding leading to rapid damage or failure of the motor windings. In an effort to prevent this condition from occurring, some applications require the provision of a rapid acting thermal protective device to be incorporated within the auxiliary winding. These rapid acting thermal protector devices are difficult to obtain in commercial quantities, and are relatively expensive, as compared with conventional thermal protectors.

Those skilled in the art will appreciate that the tapped section of the auxiliary winding of the motor shown in FIG. 14 is, in all speeds of operation, connected serially to the main winding, and thus the main winding acts like a voltage dropping resistor, and eliminates the requirement of a rapid-acting thermal protector. Thus, even though some applications of the present invention may require a separate on/off switch S2, or a double pull switch (not shown) incorporating both the speed control switch SA and the on/off switch S2, an important net savings in component costs may nevertheless be realized with the motor of the present invention. It will also be appreciated that while switch 33 has been described as an adjustable speed selector switch, such as a pull chain switch readily operable by a user to change motor speeds, switch 33 could be a switch only intended to be adjusted by a field installation person for presetting the operational speeds of a motor. For example, in a blower motor application in a residential forced air furnace, the installation person may select the desired operational speed of the blower motor, depending on duct parameters and the like, and then open up the switch housing and manually set switch arm SA so as to best approxmate the desired operation of the blower.

As with motors described above, the motor of FIG. 14 always operates, in all modes of operation, in a balanced fashion so that the energized windings are uniformly distributed around the stator, regardless of the speed of operation selected.

In view of the above, it will be seen that the other objects of this invention are achieved and other advantageous results obtained.

As various changes could be made in the above constructions or methods without departing from the scope of the invention, it is intended that all matter contained in the above description or shown in the accompanying drawing shall be interpreted as illustrative and not in a limiting sense.

What is claimed is:

1. In a multiple speed electric induction motor comprising: a stator core comprising a stack of laminations of suitable ferromagnetic material, said core having a central bore therethrough and a plurality of slots extending generally radially outwardly from said bore; a rotor rotatably received within said bore; windings inserted in said stator slots, said windings comprising a main winding and an auxiliary winding, wherein the improvement comprises:
   a capacitor, one side of which is serially connected to said auxiliary winding;
   said auxiliary winding comprising a plurality of serially connected coil sets, including a first and a last coil set, with each coil set having a plurality of serially connected coils so as to constitute the poles of said winding;
   a first tap point between said first and last coil sets of said auxiliary winding; and
   switch means for a high speed position in which a maximum number of said coil sets of said auxiliary winding is energized in series with said capacitor and in which said maximum number of said coil sets of said auxiliary winding and said capacitor are in parallel with said main winding, for a low speed position in which a minimum number of said coil sets of said auxiliary winding is energized in series with said capacitor and in which said minimum number of coil sets of said auxiliary winding and said capacitor are in parallel with said main winding and said minimum number of coil sets of said auxiliary winding are in series with the remaining coil sets of said auxiliary winding, and for connecting said main winding and said remaining coil sets of said auxiliary winding when in said low speed position so as to act as a voltage dropping means for said minimum number of coil sets of said auxiliary winding in the event said capacitor fails in a shorted mode.

2. A multiple speed electric induction motor comprising:
   a stator core comprising a stack of laminations of suitable ferromagnetic material, said core having a central bore therethrough and a plurality of slots extending generally radially outwardly from said bore;
   a rotor rotatably received within said bore;
   windings inserted in said stator slots, said windings comprising a main winding and an auxiliary winding;
   a capacitor, one side of which is serially connected to said auxiliary winding;
   said auxiliary winding comprising a plurality of serially connected coil sets, including a first and a last coil set, with each coil set having a plurality of serially connected coils placed in said stator slots at substantially equal angular intervals around said central bore so as to constitute the poles of said winding;
   a first tap point between said first and last coil sets of said auxiliary winding;
   a pair of power lines connected to a source of alternating current power, one side of said main winding and the other side of said capacitor being connected to one side of said power source and the other side of said auxiliary winding opposite said capacitor being connected to the other side of said power source; and
   a speed selector switch having a movable switch member connected to the other side of said main winding, said switch member being movable between a high speed position in which a maximum number of said coil sets of said auxiliary winding is connected in series with said capacitor, and in which said maximum number of coil sets of said auxiliary winding and said capacitor are in parallel with said main winding, and a low speed position in which a minimum number of coil sets of said auxiliary winding is connected in series with said capacitor and in which said minimum number of auxiliary coil sets and said capacitor are in series with the remaining coil sets of said auxiliary winding, said speed selector switch constituting means for connecting said main winding and said remaining coil sets of said auxiliary winding so as to protect said minimum number of auxiliary coil sets in the event said capacitor fails in a shorted condition.

3. A multiple speed electric induction motor comprising:
   a stator core comprising a stack of laminations of suitable ferromagnetic material, said core having a central bore therethrough and a plurality of slots extending generally radially outwardly from said bore;
   a rotor rotatably received within said bore;
   windings inserted in said stator slots, said windings comprising a main winding and an auxiliary winding;
   a capacitor, one side of which is serially connected to said auxiliary winding;
   said auxiliary winding comprising a plurality of serially connected coil sets, including a first and a last coil set, with each coil set having a plurality of serially connected coils placed in said stator slots at substantially equal angular intervals around said central bore so as to constitute the poles of said winding;

a first tap point between said first and last coil sets of said auxiliary winding;

a pair of lower lines connected to source of alternating current power, one side of said main winding and the other side of said capacitor being connected to one side of said power source and the other side of said auxiliary winding opposite said capacitor being connected to the other side of said power source; and a speed selector switch having a movable switch member connected to the other side of said main winding, said switch member being movable between a high speed position in which a maximum number of said coil sets of said auxiliary winding is connected in series with said capacitor and in which said maximum number of coil sets of said auxiliary winding and said capacitor are in parallel with said main winding, and a low speed position in which a minimum number of coil sets of said auxiliary winding is connected in series with said capacitor and in which said minimum number of auxiliary coil sets and said capacitor are in parallel with said main winding and said minimum number of auxiliary coil sets is in series with the other coil sets of said auxiliary winding, said switch constituting means for connecting said main winding and said remaining auxiliary winding coil sets so as to to act as a voltage dropping means and for protecting said minimum number of auxiliary winding coil sets in the event said capacitor fails in a shorted condition.

* * * * *